Patented Jan. 11, 1944

2,339,233

UNITED STATES PATENT OFFICE 2,339,233

REFRACTORY MANUFACTURE

Russell H. Hearing, Tiffin, Ohio, assignor to Basic Refractories, Incorporated, a corporation of Ohio No Drawing. Application August 3, 1940, Serial No. 351,171

11 Claims. (Cl. 106—59)

Magnesium chloride has long been employed for the bonding of magnesia brick and the like. Brick so bonded possess good strengths at atmospheric temperatures, but on subjection to temperatures of the order of 800–1000° C., such brick become crumbly and weak and have to be prefired to a temperature of the order of 1500° C. or higher in order to develop adequate strength for most services. I have discovered that calcium chloride can be used as a bond for magnesia-containing refractories and refractories utilizing calcium chloride processed according to my recommended procedure develop a strong bond which remains effective at intermediate temperatures and permits the refractory to be placed in the furnace in the unfired state where it can be fired in its ultimate location.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

As raw material for the refractory bricks or shapes, I employ from thirty to about one hundred per cent of material containing a major proportion of periclase. This may be a burned clinker made from magnesite or magnesium hydrate, or a burned magnesia clinker containing for instance 10–50 per cent of stable refractory calcium silicates, and the material should be burned to such a complete degree as to be well shrunken and not of active hydratable character, as for instance brucite or magnesite, which has been burned thoroughly at a temperature of about 1700° C. The periclase-containing material should be crushed to pass a six mesh or finer screen and a thoroughly large proportion of it should be finer than 100 mesh, for instance, any refractory mixture to be made up into shapes in accordance with the invention, should have at least 25 per cent of such finely divided periclase-containing material for advantageous bonding, and generally 30–40 per cent is desirable. Granular chrome ore, preferably of minus 6 mesh size and containing less than 10 per cent of silica, can be included in amounts from 10 to 70 per cent if desired. Since some chrome ores undergo an expansion when heated in such a mixture, the amount of a particular chrome ore which can be incorporated must be determined by trial. The refractory batch with comminuted periclase-containing material is then mixed with a small amount of calcium chloride, usually 1 to 2 per cent of $CaCl_2$ or 2 to 4 per cent of $CaCl_2.6H_2O$ and from 5 to 10 per cent of water is added for tempering the mix. Ordinarily, I use a calcium chloride solution which may range from about 15° Baumé, to about 30° Baumé, and preferably around 22° Baumé. The amount need not be very much if press-molding be employed. For instance, with a 22° Baumé solution of $CaCl_2$, 5–10 per cent of the solution may be applied as the tempering agent. Generally, about 6 per cent is suitable. It is desirable to avoid using more $CaCl_2$ than is required to give adequate strength, as excessive amounts tend to cause surface cracking and also lower the refractoriness of the product. The moistened mass is then mixed or tempered. The tempered mixture is then formed into refractory shapes. This forming is preferably done by pressing at pressures in excess of 6,000 pounds per square inch. The shapes or formed materials, are then dried at a low temperature and finally baked at an elevated temperature of not less than about 150° C. and not more than about 300° C. for several hours. Somewhat higher baking temperatures can be employed but there is no particular advantage in going above about 330° C. This can be done in one or in two operations, as desired. It is preferred to carry on the preliminary drying in a moist or relatively humid atmosphere at a comparatively low temperature, for instance below 100° C. Then, after being dried for a few hours at a low temperature, the shapes are baked for a few hours at the higher temperature of from 150 to 300° C.

Alternatively, the shapes may be subjected to gradually rising temperature, starting at around 50° C. and slowly rising for about six hours to eight hours to about 150° C., and then further slowly rising in a dry atmosphere for over ten to fourteen hours to about 300° C. This heat-treated product, as unburned refractory brick or shapes, can be stored for long periods. The shapes are remarkably tough and strong, permitting handling and shipping, and they can be laid up in furnace walls, etc., thus in an unburned condition. If desired, they can, of course, also be burned before being laid.

As a specific example, a well-shrunk, dead-burned magnesia clinker containing about 83 per cent of MgO was crushed to pass a six mesh screen and to give about 40 per cent minus 100 mesh material. This material was tempered with six per cent of a 22° Baumé solution of calcium chloride and pressed into brick at pressures of approximately 10,000 pounds per square inch. The resulting brick were dried in a slightly moist atmosphere to a temperature of 150° C. In six hours the temperature was then increased to 250° C. and the brick held at that temperature for two hours. The resulting brick, when tested, showed crushing strengths in excess of 6,000 pounds per square inch and modulus of rupture in excess of 2,000 pounds per square inch.

Other modes of applying the principle of the invention may be employed, change being made as regards the details described, provided the features stated in any of the following claims, or the equivalent of such, be employed.

I therefore particularly point out and distinctly claim as my invention:

1. A process of making refractory shapes, which comprises mixing 5 to 10 per cent of approximately a 22° Baumé solution of calcium chloride with finely divided, burned, periclase-containing clinker, forming the material into shapes and subjecting the shapes to a temperature in the range of 150–300° C. for several hours.

2. A process of making refractory shapes, which comprises mixing about one to two per cent of $CaCl_2$ and water to form a strong calcium chloride solution with finely divided burned periclase-containing clinker, forming the material into shapes, and subjecting the shapes to a temperature in the range of 150–300° C.

3. A process of making refractory shapes, which comprises mixing about one to two per cent of $CaCl_2$ and about six per cent of water, with finely divided burned periclase-containing clinker, forming the material into shapes, drying the shapes in a humid atmosphere at a temperature below 100° C. and subjecting the shapes to a temperature in the range of 150–300° C. for several hours.

4. A process of making refractory shapes, which comprises mixing about six per cent of a 22° Baumé solution of calcium chloride with finely divided burned periclase-containing clinker, forming the material into shapes, and subjecting the shapes to elevated temperature in the range of 150–300° C.

5. A process of making refractory shapes, which comprises mixing about one to two per cent of $CaCl_2$, and water, with not less than 30 per cent finely divided burned periclase-containing clinker and 20 to 70 per cent of granular chrome ore, forming the material into shapes and subjecting the shapes to a temperature in the range of 150–300° C.

6. A process of making refractory shapes, which comprises mixing about five to ten per cent of a 15° to 30° Baumé calcium chloride solution with not less than 30 per cent of finely divided burned periclase-containing clinker and 20 to 70 per cent of granular chrome ore, forming the material into shapes, drying and subjecting the shapes to a temperature in the range of 150–300° C. for several hours.

7. A process of making refractory shapes, which comprises mixing a small amount of a strong calcium chloride solution with burned periclase-containing clinker, forming into shapes, and subjecting the shapes to a temperature too low to fire the shape and not over about 330° C. and not less than about 150° C. for several hours.

8. An unfired, low-temperature baked periclase-containing refractory shape bonded with comminuted periclase containing clinker and from 1 to 2 per cent of $CaCl_2$ and having a crushing strength in excess of 6,000 pounds per square inch.

9. An unfired, low-temperature baked periclase-containing refractory shape bonded with comminuted periclase containing clinker and $CaCl_2$ in effective amount to give desired strength.

10. An unfired, baked periclase-containing refractory shape comprising granular chrome ore and at least 30 per cent of comminuted periclase-containing clinker and from one to two per cent of $CaCl_2$.

11. An unfired, baked periclase-containing refractory shape comprising granular chrome ore and at least 30 per cent of comminuted periclase-containing clinker and from one to two per cent of $CaCl_2$, and having a crushing strength in excess of 6,000 pounds per square inch.

RUSSELL H. HEARING.